United States Patent [19]

Lowe

[11] 4,239,185
[45] Dec. 16, 1980

[54] VALVE

[76] Inventor: Walter D. Lowe, 41 Hawksbury Dr., Willowdale, Ontario, Canada, M2K 1M4

[21] Appl. No.: 24,980

[22] Filed: Mar. 29, 1979

[51] Int. Cl.³ ............................................. F16K 25/00
[52] U.S. Cl. ....................................... 251/164; 251/309
[58] Field of Search ................................. 251/164, 309

[56] References Cited

U.S. PATENT DOCUMENTS

| 688,298 | 12/1901 | Foss | 251/164 |
|---|---|---|---|
| 845,540 | 2/1907 | Ferguson | 251/164 |
| 2,076,841 | 4/1937 | Heggem | 251/164 |
| 2,633,326 | 3/1953 | Givens | 251/164 |
| 2,858,097 | 10/1958 | Blowstren | 251/164 |
| 3,429,553 | 2/1969 | Smith | 251/164 X |

*Primary Examiner*—Harold W. Weakley
*Attorney, Agent, or Firm*—Fetherstonhaugh & Co.

[57] ABSTRACT

The invention is a valve with a tapered plug that seats in a through flow passage in the body. The plug has a through opening so that by rotating the plug through 90° one can control flow through the valve. The plug is tapered and, as it is rotated in the counter-clockwise direction to open, it is also lifted slightly from its seats. As it is rotated in the clockwise direction to close, the plug is pressed slightly down to form a sealing engagement with its seats. The combination of rotational and vertical movements—in effect a spiral motion—of the plug provide a valve that has an effective seal, ease of manipulation and full throttling with ¼ turn of the tapered plug.

1 Claim, 3 Drawing Figures

VALVE

This invention relates to a valve.

The valve of this invention is useful and practical for a wide range of use. It differs structurally from ball valves, globe valves, gate valves and plug valves but can be used in applications where each of these established valve classifications are used. It, moreover, has advantages over these known classifications of valves for many applications.

A ball valve is a well known type of valve that offers straight through flow upon one-quarter turn of the operating handle. One of the disadvantages of commonly used types of ball valves is that they tend to require a plastics sealing member. Sealing members are expensive, costly and cannot be used at high temperatures because of heat damage to the seal. The valve of this invention employs all metal parts and can be operated from a no-flow to a full-flow position with one-quarter turn of the operating handle. It, thus, has the prime advantage of commonly used ball valves but avoids the difficulty of seal damage in high temperature service.

A globe valve employs a tapered disc that jams into a narrow seating face. It requires multiple turns of the operating stem to fully open it from a closed position and it usually does not have a straight through flow. It is, for some applications, preferred over the ball valve because the parts are all metal and can stand higher temperatures. However, it has the disadvantage that it requires several turns to close it from a full open position. This is a disadvantage in many control operations where fast closure is important. It also has the disadvantage that it does not provide for a straight through flow. Resistance is, therefore, increased and pressure drops through valves can be important factors in plant design.

A gate valve also employs a tapered wedge into tapered seats and requires multiple turns of the operating stem to open and close. Generally, gate valves are not suitable for throttling. Flow characteristics of the gate valve are not as good as this invention because of turbulence created at the gate valve seats.

The plug valve can be operated from a full open position to a closed position with one quarter of a turn but the bearing surface between the plug and its body or casing is large and it requires considerable force to open and close it. Commonly used plug valves employ a lubricant injected between the working faces as a seal. It is not suitable for high temperature use nor is it suitable for use with food products.

The valve of the present invention has, or can be made with, all metal parts. It is, thus, suitable for high temperature applications. It can be operated from the full open to the full close position with one-quarter of a turn and the operating pressure is relatively light because the pressure on the seats is reduced simultaneously as the valve is opened. With the valve of the present invention, it is also relatively easy to compensate for wear. There is straight through flow.

A valve according to the present invention comprises a body with a through flow passage; a plug having a tapered cylindrical wall extending transversely across said through flow passage; a ring-shaped seat on each of the opposed sides of the tapered cylindrical wall of said plug in the through flow passage; said plug being formed with a through transversely extending opening at said tapered cylindrical wall and being seated in sealing relation in said seats with its opening misaligned with said through flow passage of said body whereby to close said through opening of said body to flow; operating means for simultaneously rotating the plug between the seats and moving it transversely of the through opening in the body in the direction of increasing diameter of the taper of the plug to turn the opening in the plug from non-alignment with the through opening in the body to alignment with the through opening in the body whereby to establish flow through the valve and to relieve the tightness of the sealing relation of the plug with the seat.

The invention will be clearly understood after reference to the following detailed specification read in conjunction with the drawings.

Figure 3:
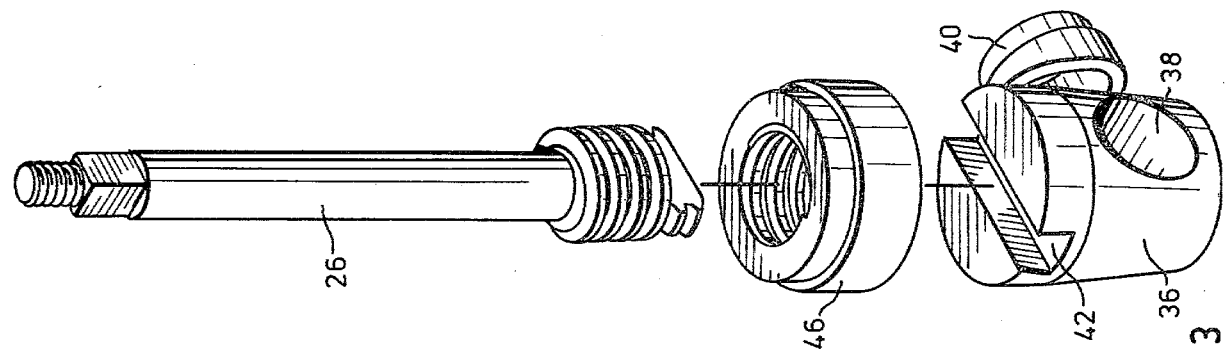
FIG. 3 is an illustration of the stem, seal nut, plug and one of the seats of the valve of FIG. 1.

In the drawings, the numeral 10 generally refers to a valve. Its body 12 has a bonnet 14 which is secured thereto by means of four bolts 16 and a gland flange 18 which is secured to the bonnet by means of bolts 20. Conventional packing rings are indicated by the numeral 22. A handle 24 on the free end of stem 26 is operable to take the valve from full off to full flow with a 90° turn as will be explained. Stop 28 on plate 30 which is, in turn, supported on the arms 32 of bonnet 14 locates the position of the handle 24 that corresponds to the full open position of the valve as will be explained.

Figure 2:
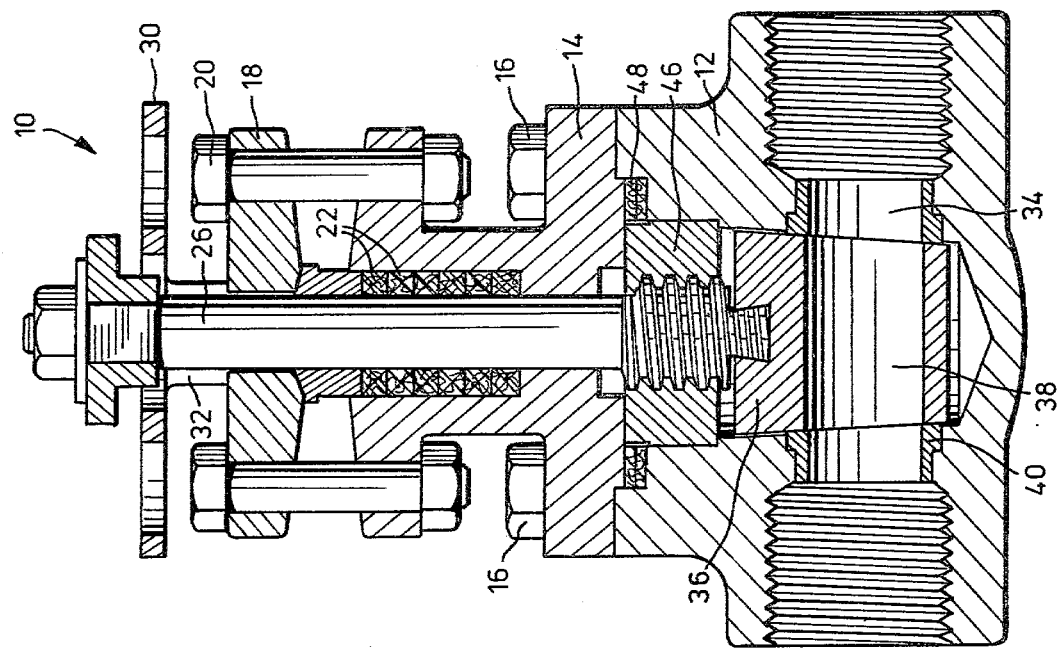
FIG. 2 is a pictorial view of the valve of FIG. 1.
Figure 1:
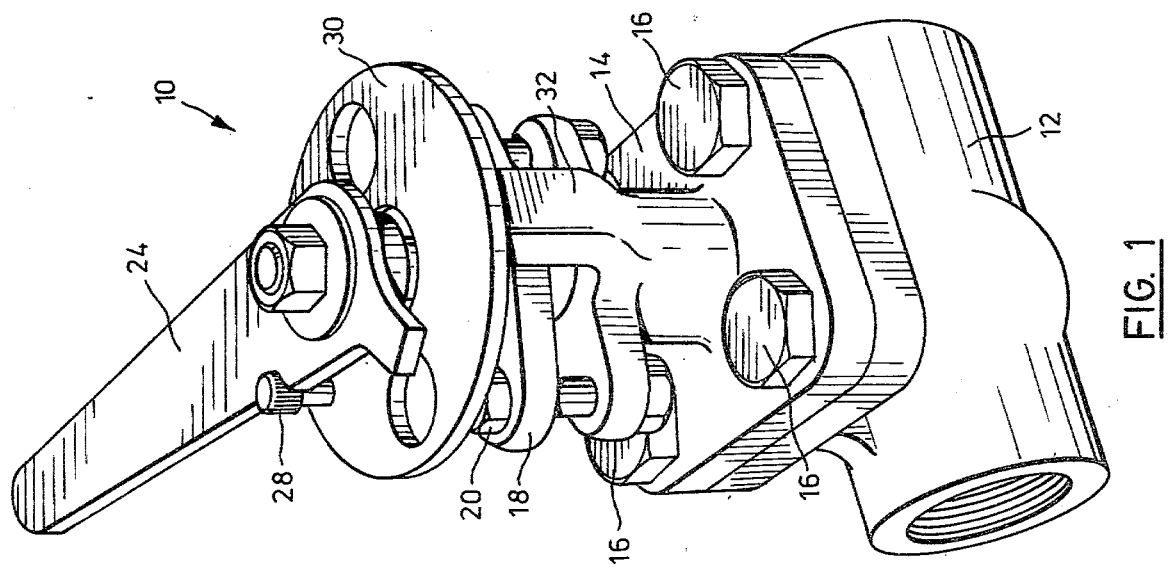
FIG. 1 is a perspective illustration of an embodiment of a valve according to this invention.

The body 12 has a through flow passage 34 with an inlet and an outlet end. A tapered plug 36 extends across the flow passage 34 and is of a transverse dimension such that when it is rotated about its own longitudinal axis to dispose its flow passage 38 in a direction transversely across the flow passage 34 of the body, it closes off flow through the body. In FIG. 2, the plug 36 is rotated within its mounting in the body such that its through opening 38 is aligned with the through opening 34 of the body 12. In this position, through flow through the valve is established.

The seating of the plug 38 in the body is of importance in the valve assembly. The plug is seated in sealing relation and for rotation in the tubular seats 40, the ends of which form a circular marginal area around the through opening and are machined to engage with the tapered walls of the plug to form a sealing engagement therewith when the opening of the plug and opening in the body are not aligned, i.e., when the plug is rotated 90° from the position of FIG. 2. Plug 36 has a dove-tail transversely extending slot 42 at its upper end that communicates in sliding relation in the transverse direction with the dovetailed end of the stem 26 so that as the stem is turned the plug will be in tight sealing relation with its seats. It will be apparent that any slight misalignment of the longitudinal axis of the stem and the longitudinal axis of the plug will be compensated for by relative sliding movement.

Stem 26 has a threaded portion that threadedly engages in the nut 46. Nut 46, in turn, is seated in the body and clamped into position by the securement of the bonnet 14. The numeral 48 refers to an appropriate gasket.

The seats 40 are machined on conventional bar or screw machines and are finished there except for seat faces finish.

The second operation is to place the seats in pairs, which become a set, in a fixture which exactly duplicates the internal configuration of the body and to bore the complementary included angle of the taper of the plug. The taper is variable but 7° works well.

The third operation is to grind, bore, lap or polish the sealing faces.

The seats, as a pair, are then inserted in the body and oriented in their correct position by inserting the plug 36 in its place. The plug is then pressed down to apply a force above the service sealing pressure. The outer ends of the seats are then punched, mandrel expanded or welded to retain them tightly in the body.

In the assembly of the valve, the stem 26 and plug 36 and ring 46 combination is dropped into the seats 34 and the plug is seated with the required amount of pressure to achieve a seal for the intended valve service. The through opening of the plug extends transversely of the through opening of the body at this stage of assembly, i.e., it is in the no flow position. The nut 46 is, then, threaded downwardly on the stem to assume its seated position within the body 12. The bonnet 14 is, then, secured into place, following which the gland flange and handle arrangement are put into place.

It will be apparent that, by turning the handle 24 to achieve a 90° rotation of the stem 26 from the no flow assembly position, one can move the plug 36 to a position as illustrated in FIG. 2 where the through opening of the plug and the through opening of the body are aligned. By turning the handle back through 90°, one returns the valve to a position where the opening in the plug 36 extends transversely across the opening 34 of the body and the transverse extent of the plug is in sealing relation with the seats 34 to stop through flow through the body of the valve. As indicated, stop 26 locates the open position of the valve.

As the plug is turned from the no flow fully seated position by the stem, it is also slightly lifted. The combination of lifting and turning tends to reduce the sealing pressure during opening having regard to the taper of the plug. The lift, however, is relatively small because it only involves ¼ turn so that misalignment of openings is not a problem.

It will be noted that, with this valve, metal to metal seating of the disc and seats is achieved. The avoidance of polymer seals in a valve of this type is very important in some applications where high temperatures are encountered.

The achievement of a reliable operation with one quarter turn of the stem handle is also of importance because speed of closure can be very important where dangerous chemicals and the like are being controlled. The achievement of quarter turn operation with the other features of this valve is of importance.

The flow characteristics of the valve are particularly good because it will be observed that there is a straight flow feature on opening of the valve that is comparable to a ball valve. The straight flow feature of the ball valve is acknowledged to be better than the gate or globe valve but it has not been acheived with many of the other features of this valve in combination before. For example, most ball valves require polymer seals or do not achieve a straight through flow.

The trim and body bonnet materials can be made from combinations of materials to achieve wide range of services.

The unique rotational and translation motion of the valve plug achieves a tight seal. The angle of the plug 36 can be varied but it has been found that if sides of the plug incline inwardly at an angle of about 7° from the vertical, a high sealing pressure of seats to plug can be achieved. The closing torque and positioning of the disc are variable by means of the adjustable stem nut 46. For example, when assembling the valve, one can initially force the plug into the seats with a heavy or a light pressure. After the plug has been initially located within its seats, the nut 46 is, then, located in position as explained above. By providing for more or less of a tight fit at the assembly stage, one can have varying closing torques. One can also compensate for wear in use by disassembling the valve and resetting the closing pressure.

It will be noted that the valve does not rely on springs or washers and this is an advantage over many types of valves with which this one is competitive. Clearances between the plug and body except at the machined seats are provided. The plug and seats can be made from any compatible combination of metals, such as, straight chromium ferritic stainless steels of the 400 series (ferritic) such as 416; chromium nickle steels (austenitic) of the 300 series such as 316; hard faced combinations of the above or various combinations of bronzes such as Astm B-61, B62 or B198. Body-bonnet materials can be of any metal compatible with the operating conditions. Most services are within the scope of Astm-A-105-II. The valve has the operating temperature limits of a gate valve but is capable of very much more controllable operation. The control is fine enough that the valve can be made to throttle with a ratchet and pawl hand lever.

The embodiment of the invention described is capable of variation. It will be apparent to those skilled in the art that there are many other valve bonnet styles to which the invention could be applied. It is not intended that the scope of the invention should be limited to the embodiment illustrated.

Similarly, the body-bonnet joint need not be bolted. It can be of the screwed union type or full strength welded.

The valve will appropriately have two ratings. The first will be a temperature rating, e.g., 850° F. which would be the maximum operating temperature limited to 800 psig. Thus, the valve can be used on steam anywhere within the two parameters given.

The second rating is a water, oil or gas rating, called WOG in the valve industry, which is an operating pressure for and of water, oil or gas at ambient temperature (70° F.)

With the proper materials selected to avoid corrosion, the valve can be used on any service within its ratings. This valve has an extremely wide spectrum that covers most services in steam plants, chemical plants, refineries, pump houses, corporation services, gas gathering and well-head applications.

Generally, sealing pressure is determined by two factors:
(a) the pressure to be controlled; and
(b) the compressive strength of the seat material being used.

The upper limit for sealing pressure preferably is limited by design to a safety factor of 4 or 25% of the compressive strength of the material. This determines the minimum area of the seat contact surface.

For lower operating pressures, seat face area can be reduced to lower the torque required to open and close. For high pressures, harder seating surfaces would be used, i.e., higher compressive strength and the contact or sealing area would be increased. It will be evident from the above that contact areas and sealing pressures are almost infinitely variable.

What I claim as my invention is:

1. A valve comprising:

a body with a through flow passage;

a metal plug having a tapered cylindrical wall extending transversely across said through flow passage;

a metal ring-shaped seat on each of the opposed sides of the tapered cylindrical wall of said plug, each ring-shaped seat being supported in a through flow passage and extending beyond the body toward the plug;

said plug being formed with a through transversely extending opening at said tapered cylindrical wall and being seatable in sealing relation against said seats with its opening misaligned with said through flow passage of said body whereby to close said through opening of said body to flow;

a stem for said metal plug having an axis and having a threaded portion;

a mounting nut in threaded engagement with said threaded portion of said stem;

a seat on said body for said mounting nut shaped to receive and support said nut, said nut being freely rotatable into contact with the body seat while the metal plug is seated in the metal ring-shaped seats with predetermined seating pressure and position;

clamping means for clamping said nut in any selected rotational position and in rigid relation with respect to said body seat and sealing it in said body, whereby the nut can be clamped rigidly with respect to the body to select a substantially infinitely variable range of opening and closing torques;

said plug being mounted on one end of said stem, the other end of said stem being accessible to rotate the stem whereby to rotate the plug between the ring-shaped seats and simultaneously move it transversely of the through flow passage in the body in the direction of increasing diameter of the taper of the plug to turn the opening in the plug from nonalignment with the through flow passage in the body to alignment with the through flow passage in the body whereby to establish flow through the valve and to lift it from the ring-shaped seats in the axial direction of the stem to relieve the tightness of the sealing relation of the plug with the ring-shaped seats; and connecting means connecting said stem with said plug for relative movement in the direction transverse of the longitudinal axis of said stem.

* * * * *